United States Patent Office 3,509,865
Patented May 5, 1970

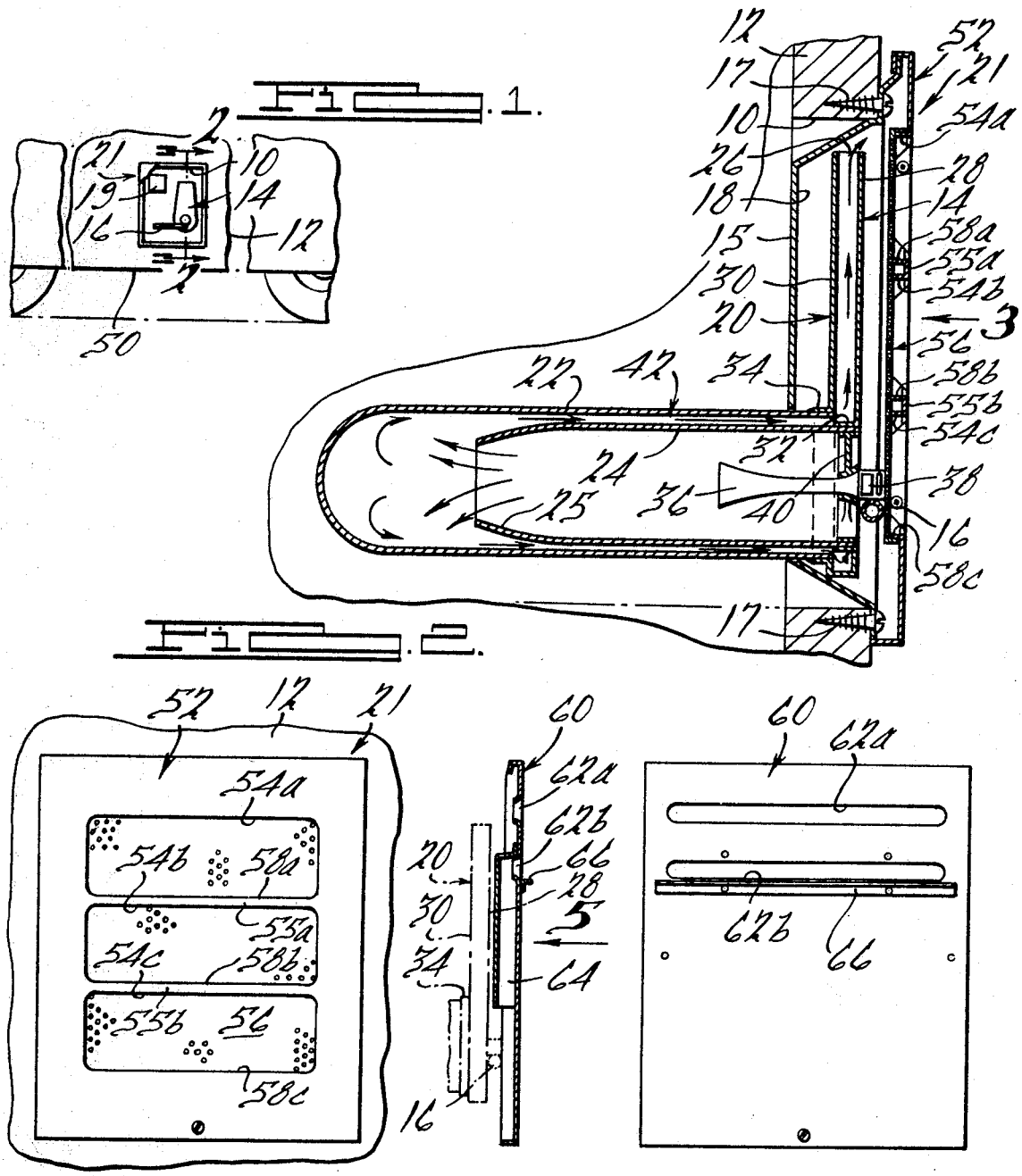
INVENTOR.
Donald E. Robinson
BY
Harness, Dickey & Pierce
ATTORNEYS

3,509,865
PANEL FOR HEATER CONSTRUCTION
Donald E. Robinson, Northville, Mich., assignor to Philips Industries, Inc., Dayton, Ohio, a corporation of Ohio
Filed Mar. 28, 1968, Ser. No. 716,860
Int. Cl. F23l 17/04
U.S. Cl. 126—85                                 18 Claims

ABSTRACT OF THE DISCLOSURE

A cover for the inlet and outlet of heaters for domestic use and including deflection plate means for deflecting air in such a manner whereby flame-out tendencies are inhibited.

---

The present invention relates to heaters for domestic use and more particularly to a cover or panel for use over the heater inlet and outlet to prevent flame-out.

The present invention is shown and described in conjunction with the heater shown and described in the U.S. patent to Robinson, No. 3,353,528, issued Nov. 21, 1967; while the details of that patent are incorporated herein by reference, it is to be understood that the present invention is not limited to those specific details and, as will be seen, can be used with other heater constructions.

With heaters of the above patented type and mounted on a structure such as a trailer, various wind conditions, either while the trailer is being hauled or is stationary, can cause the pilot light to be extinguished. This can be especially annoying when a trailer is being hauled in below freezing weather conditions since unless the heater is maintained in operation there is the possibility of water freezing, etc. Thus in these cases the vehicle operator must periodically stop the vehicle to relight the pilot. In the present invention a cover or panel construction has been provided whereby the chances of flame-out have been greatly reduced.

Therefore, it is an object of the present invention to provide a new cover construction for heaters of the above noted type which construction prevents flame-out from various wind conditions.

It is especially important in trailer applications that the cover or panel be substantially flush with the trailer side wall. Therefore, it is another object to provide a new cover construction for trailer heaters which prevents flame-out and which is substantially flush with the trailer side wall.

It is a general object to provide a new and improved heater cover.

Other objects, features and advantages of the present invention will become apparent from the subsequent description and the appended claims, taken in conjunction with the accompanying drawings, in which:

FIG. 1 is a pictorial representation of a heater mounted to an outside wall of a house or trailer with the cover of the present invention shown partially broken away;

FIG. 2 is a sectional view to increased scale of the apparatus of FIG. 1 taken substantially along the line 2—2;

FIG. 3 is an elevational view to reduced scale of the apparatus of FIG. 2 viewed in the direction of the arrow 3;

FIG. 4 is a sectional view similar to FIG. 2 of a modified form of the invention; and FIG. 5 is an elevational view of the apparatus of FIG. 4 taken in the direction of the arrow 5.

In FIG. 1 an opening 10 is shown in the side wall 12 of a trailer, with the opening receiving an atmospheric operated heater 14 which receives fuel via a fuel line 16. The heater 14 can be controlled by appropriate control apparatus well known in the art and generally indicated by the numeral 19. Looking now to FIG. 2, a mounting plate 15 is in the opening 10 and is mounted to the side wall 12 by fasteners 17. The plate 15 is of a dished construction and defines a recess 18 which extends interiorly from the outer surface of the wall 12 and hence locates a portion of the heater 14 exteriorly of the trailer; the recess 18 is covered by a cover plate 21 constructed in accordance with the present invention, the details of which are to be described.

The heater 14 is of a simple construction including a vent or flue tube 20, a heat exchanger tube 22 and a flame tube 24. The vent tube 20 is formed of a generally rectangular cross-section which is decreasing from its lower end to its upper end and which is defined in part at least by outer and inner walls 28 and 30, respectively. The vent tube 20 terminates at its upper end in an opening 26 to permit the escape of products of combustion. Proximate its lower end, the vent tube 20 in its outer wall 28 has an inwardly extending annular flange 32 and in its inner wall 30 has an inwardly extending flange 34 which is coaxial with and of a larger diameter than the annular flange 32.

The flame tube 24 is open at both ends and has its outer end of a diameter generally equal to the inside diameter of the annular flange 32 and is located therein and secured thereto. Thus the flame tube 24 secured at its outer end to flange 32 extends inwardly from the vent member 20 through opening 10 and into the confines of the space to be heated. The flame tube 24 tapers radially inwardly at its inner end 25.

The chamber tube 22 is enclosed at its inner end and open at its outer end which is generally of a diameter equal to the inner diameter of the flange 34. Its outer end is secured to the flange 34. A burner member 36 has its inlet located outwardly from the outer end of the flame tube 24 and extends inwardly into the tube 24 and has its outlet end located within the confines of burner tube 24. The burner 36 can be of a conventional construction and includes an air inlet 38 with fuel being injected via the line 16. The burner 36 is supported within the burner tube 24 by a support ring 40 which is opened and in turn is supported at the outer end of the flame tube 24. Combustion takes place within the flame tube 24 with the chamber tube 22 receiving heat for transfer to an appropriate medium, i.e., water and air, etc., via radiation from the flame tube 24 and via the products of combustion. The chamber tube 22 extends beyond the open inner end of the flange tube 24 to define a volume to receive the products of combustion. The flame tube 24 is of a smaller diameter than the chamber tube 22 whereby an annular passageway 42 is defined therebetween. In operation, fuel injected via the line 16 is burned at the outlet end of the burner 36 within the flame tube 24. The products of combustion generally move into the space between the end of the flame tube 24 and the chamber tube 22 and then travel through the annular passageway 42, which also extends between annular flanges 32 and 34, and then up through the passageway through the vent tube 28 and out through the opening 26 to the atmosphere. The chamber tube 22 can be utilized to transfer heat either to water or to the adjacent air. Note that the exit 26 of the flue pipe 20 and the input to the burner tube 24 are located within the same recess 18.

In order to maintain the pilot of the burner 36 of heater 14 lit it is important to avoid pressure reversals where the pressure at the outlet of vent tube 20 exceeds the pressure at the inlet of flame tube 24. While the cause of flame-out is not known with irrefutable certainty, it is believed to be caused by various wind conditions against the wall 12 of a trailer or the like. Air or wind directed at the wall 12 of the trailer will result in air flow vertically downwardly across the face of the opening 18. The downwardly directed air, as it reaches the botom 50 of the wall 12 in its flow towards a path underneath the body of the trailer, increases in velocity resulting in a gradient of pressure decreasing in magnitude in a vertically downward direction. Since the opening 18 (and hence heater 14) are located near the bottom 50 of wall 12, this gradient of pressure will appear across the opening 18 thus tending to reduce the pressure to a greater extent at the inlet than at the outlet. Under severe gusts of wind or gusts of air (as from passing vehicles in close proximity and at high speeds) the pressure gradient could momentarily provide a high enough differential to cause reverse flow trhough burner 36 resulting in flame-out. By the use of the panel or plate 21 constructed in accordance with the present invention, flame-out from such adverse wind or air flow conditions is virtually eliminated.

It has been found that by constructing the plate 21 to have a non-uniform section in the direction and in the path of air flow across the opening 18 such as to generally reduce the velocity differential at least in the area close to and across the plate 21 (and hence across the opening 18), flame-out is virtually eliminated.

Looking now to FIGS. 2 and 3, the cover plate 21 is constructed of a generally rectangular, hollow frame 52 having three rectangular openings 54a, b and c, defined by a pair of cross bar portions 55a and 55b and a perforated screen member 56 secured to the back of the frame 52 and extending across the openings 54. The cover plate 21 is secured to the dished plate 15 and generally covers the opening or recess 18. The openings 54a, b and c have horizontally, inwardly extending ledges 58a, b and c with ledges 58a and 58b being the upper surfaces of bar portions 55a and 55b (the lower extremities of openings 54a and 54b) and with ledge 58a being defined by the lower extremity of the opening 54c. The ledges 58a–c provide discontinuities in the downward air flow path and tend to deflect or otherwise interrupt the flow of the air reducing its downward velocity. The perforated screen 56 acts as a baffle and also aids in preventing flame-out. Note that while the ledges 58a–c are formed and define the necessary discontinuities to prevent flame-out, the general overall result and appearance, including panel 21 is a construction substantially flush with the trailer wall 12; this feature is important since the maximum permissible trailer width includes any outwardly extending projections. The number of ledges such as ledges 58a–c can be varied for different applications; however, the preferred flush panel design is the panel 21 as shown in FIGS. 2 and 3; panel 21 has three ledges 58a–c and two of the ledges 58 and 58b are located between the inlet and outlet of the burner 16.

An alternate panel design is shown in FIGS. 4 and 5. There a panel 60 includes a pair of narrow, horizontally extending slots 62a and 62b. Slots 62a and 62b are located at the upper end of panel 60 and are spaced relatively near each other. Upper slot 62a is positioned to be proximate and in direct communication with the exhaust outlet from vent tube 20. The lower slot 62b, however, is communicated to the inlet of burner 16 by a downwardly extending tube structure 64 which is closed at its upper end and open at its lower end proximate the inlet of burner 16. A horizontal, narrow ledge 66 is located just below the lower slot 62b; ledge 66 performs the same function as ledges 58a–c such that the downward velocity across the slots 62a and 62b is reduced thereby maintaining the pressure differential thereacross such that air flow reversal through burner 16 is inhibited and flame-out prevented. Again note that panel 66, except for the very slight horizontal projection of ledge 66, provides a substantially flush construction.

While it is believed that the above constructions provide for a reduction in air velocity, and hence pressure differential across the face of the opening 18, it is also believed that the discontinuities, i.e. ledges 58a–c of FIGS. 2 and 3 and ledge 66 of FIGS. 4 and 5, create areas of non-laminar flow or turbulence which also tend to reduce the air velocity to prevent flame-out.

In addition to the flame-out problem caused by certain wind conditions there is also the possibility that with the burner 36 lit these wind conditions could reverse the pressure differential between inlet and outlet causing the flame from burner 36 to reverse itself and burn in a direction out from the burner tube 24. Once this occurs there is a tendency for the flame to continue burning in that reverse direction (even after termination of the wind condition originally causing it) resulting in a hazardous condition with flames located at the outside of the trailer body. The panel constructions of the present invention eliminate the reverse burning tendency and hence offer a further advantage in addition to flame-out prevention.

A further advantage is in the fact that in creating a positive pressure differential panels of the present invention aid in the natural flow of air into the burner and exhaust out from the burner preventing recirculation of the products of combustion and enhancing the burning characteristics of the burner.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In an atmospheric operated heater located in a trailer body or the like having a generally vertically extending wall exposed to natural elements with the heater located in that wall and having an inlet and an outlet located above the inlet with the inlet and outlet located in an opening in the wall, said heater including an atmospherically operative burner member having its inlet located proximate the heater inlet, the improvement comprising: a vent panel, separate from the heater inlet and outlet, for directing air to the heater for combustion, said vent panel located over the opening and being generally flush with the wall and including deflection plate means extending generally horizontally across the opening for deflecting air generally moving in a direction along the wall and for reducing the velocity of the air moving over the outer face of said vent panel and providing a positive pressure differential between inlet and outlet, said vent panel being spaced from the heater whereby the relationship of the outlet being above the inlet is maintained.

2. The apparatus of claim 1 with said deflection plate means comprising at least one horizontally extending ledge.

3. The apparatus of claim 2 comprising a single, horizontally narrow ledge located below the outlet.

4. The apparatus of claim 1 with said deflection plate means comprising at least two horizontally extending, vertically spaced ledges located between the inlet and outlet.

5. The apparatus of claim 4 with said vent panel comprising a frame having a plurality of vertically spaced openings at least partially defined by said ledges.

6. The apparatus of claim 5 with said vent panel comprising a perforate member generally covering each of said openings behind said ledges.

7. The apparatus of claim 6 with said vent panel having three said openings and three ledges including said at least two of said ledges.

8. The apparatus of claim 1 with said panel having a pair of horizontally extending, vertically spaced openings located at the upper end of said panel with one of said openings being in communication with the outlet and with the tube means placing the other of said openings in communication with and near the inlet.

9. The apparatus of claim 8 with said deflection plate means comprising at least one horizontally extending horizontally narrow ledge.

10. The apparatus of claim 9 comprising a single ledge located below the lower one of said openings.

11. In an atmospheric operated heater located in a trailer body or the like having a generally vertically extending outside wall with the heater located on that wall and having an inlet and an outlet located above the inlet, said heater including an atmospherically operative burner member having its inlet located proximate the heater inlet, the improvement comprising a vent panel located over the inlet and outlet and including deflection means extending generally horizontally proximate at least one of the inlet and outlet for providing a discontinuity to the vertical flow of air in the path generally across the wall and between the inlet and outlet whereby flame-out tendencies are inhibited, said vent panel being spaced from the heater whereby the relationship of the outlet being above the inlet is maintained.

12. The apparatus of claim 11 with said deflection means comprising at least one horizontally extending ledge located in said path whereby the velocity of air in said path under gust conditions is reduced.

13. The apparatus of claim 11 with said deflection means comprising at least one horizontally extending horizontally narrow ledge located in said path and below the outlet whereby the velocity of air in said path under gust conditions is reduced and a positive pressure differential maintained between inlet and outlet.

14. The apparatus of claim 11 with said vent panel, including said deflection means, being substantially flush with the outside wall.

15. In an atmospheric operated heater located in a trailer body or the like having a generally vertically extending wall exposed to natural elements with the heater located in that wall and having an inlet and an outlet located above the outlet, with the inlet and outlet located in an opening in the wall, said heater including an atmospherically operative burner member having its inlet located proximate the heater inlet, the improvement comprising: a vent panel, separate from the heater inlet and outlet, for directing air to the heater for combustion, said vent panel located over the opening and being generally flush with the wall, said vent panel including a baffle member generally covering the opening and deflection plate means extending generally horizontally across said baffle member and projecting outwardly therefrom for deflecting air generally moving in a direction along the wall whereby reverse air flow through the heater is inhibited.

16. The apparatus of claim 15 with said baffle member being perforated.

17. The apparatus of claim 16 with said deflection plate means comprising at least two ledges located between the heater inlet and outlet.

18. The apparatus of claim 15 with said baffle member being imperforate and including a pair of slots located proximate each other and generally in the upper portion of the opening, one of said slots communicating with the burner inlet and the other with the burner outlet, said deflection means comprising at least one horizontally extending, outwardly projecting ledge located proximate to and beneath said slots.

References Cited

UNITED STATES PATENTS 3,410,193   11/1968   Clark.

FOREIGN PATENTS 205,199   9/1959   Austria.
505,712   8/1930   Germany.
537,657   7/1941   Great Britain.

CHARLES J. MYHRE, Primary Examiner

U.S. Cl. X.R.

98—32; 126—307